United States Patent [19]

Lipman

[11] Patent Number: 4,773,587
[45] Date of Patent: Sep. 27, 1988

[54] HEATING AND AIR CONDITIONING FAN SENSOR CONTROL

[76] Inventor: Wilfred E. Lipman, 4281 Leventis St., Charleston, S.C. 29405

[21] Appl. No.: 114,698

[22] Filed: Oct. 29, 1987

Related U.S. Application Data

[63] Continuation of Ser. No. 901,417, Aug. 28, 1986, abandoned.

[51] Int. Cl.$^4$ .............................. F24N 19/10
[52] U.S. Cl. ................... 236/11; 236/DIG. 9; 62/231; 165/12; 165/26
[58] Field of Search ............ 236/11, 10, DIG. 9; 62/180, 182, 231, 157, 158; 165/26, 12

[56] References Cited

U.S. PATENT DOCUMENTS

| | | | |
|---|---|---|---|
| 3,921,899 | 11/1975 | Hamilton | 236/11 X |
| 4,136,730 | 1/1979 | Kinsey | 62/231 X |
| 4,167,966 | 9/1979 | Freeman | 165/2 |
| 4,369,916 | 1/1983 | Abbey | 361/394 |

Primary Examiner—Harry B. Tanner
Attorney, Agent, or Firm—Craig B. Killough

[57] ABSTRACT

A device is disclosed which causes a fan of a heating and/or air conditioning system to continue to run until the temperature in the duct work of the system reaches a desired temperature, so as to remove all heated and/or cooled air from the system, however, the device is designed so as to not cause the fan to be actuated due to changes in the duct work temperature which are due to changes in outside temperature or causes other than the operation of the system. A sensor which is located in the duct work controls the operation of the fan in response to temperature changes only if the sensor control circuit is first energized by the operation of the system.

2 Claims, 2 Drawing Sheets

HEATING AND AIR CONDITIONING FAN SENSOR CONTROL

This application is a continuation of Ser. No. 901,417, filed Aug. 28, 1986, now abandoned.

FIELD OF THE INVENTION

This invention relates to heating and air conditioning systems generally, and is more specifically directed to a control system which causes a fan, which forces and directs air in a heating and air conditioning system, to continue to run after the heating or air conditioning system has ceased to operate so as to remove all of the heated or cooled air which remains in the system and duct work, so as to improve the efficiency and economy of the system, while not being activated by changes in the ambient air temperature.

BACKGROUND OF THE INVENTION

In central heating and air conditioning systems, a central heating and/or air conditioning unit produces heated or cooled air. This heated or cooled air is directed from the system through a series of ducts throughout a building so as to place the heated or cooled air into the desired location. The heated or cooled air is forced from the heating and/or air conditioning system by means of a fan, blower, or air handler.

Typically, a thermostat is used to actuate the heating unit when the air temperature within the building drops below a desired level, and similarly, the thermostat is used to actuate the air conditioning system when the ambient air temperature within the building rises above a certain level. Actuation of the system causes heated or cooled air to be forced into the building, and the system switched off by the thermostat when the building's air temperature again reaches the desired level.

In many heating and air conditioning systems commonly in use, the thermostat activates the fan and the heating or air conditioning unit simultaneously, and switches off the fan and unit simultaneously, or, particularly with heating systems, the fan may continue to run after the unit is switched off until the plenum reaches a predetermined temperature. The result of this is that all of the heated or cooled air present in the system and in the duct work at the time of shut off is not removed from the duct work by the fan since the fan ceases to operate at the same time as the heating or air conditioning unit ceases to operate, or when the plenum temperature reaches the predetermined level. Accordingly, air which has been heated or cooled by the unit remains in the duct or the unit and is not directed into the building, wasting heated or cooled air.

This problem has been addressed by the prior art. Certain devices cause the fan to continue to be operational for a period of time after the heating or air conditioning unit ceases to operate. This system is not satisfactory in that the blower or fan may operate for longer than is necessary to remove the remaining heated or cooled air from the duct work, or may not operate long enough to remove all of the heated or cooled air from the duct work. Since the optimum time for the fan or blower to continue to operate after the heat or air conditioning system has been deactivated varies according to several factors, including outside ambient air temperatures versus inside ambient air temperatures, a set predetermined time does not achieve a wholly satisfactory result.

Another approach has been to place a second thermostat within the system or duct work itself. This second thermostat is used to insure that the fan continues to run until a desired temperature is reached. The problem with this type of system is that, if a thermostat alone is used, the fan may be actuated independently of the heat and/or air conditioning system due to ambient air temperature changes. For example, the thermostat which is used to determine the presence of cool air in the duct work, and therefore causes the fan to continue to operate, may be activated by cold, outside air in the winter time. The fan may therefore begin to operate, not in response to removing remaining heated or cooled air from the system, but in response to the outside ambient air temperature affecting the temperature in the duct. A similar situation may result from hot air from the outside in the summer.

SUMMARY OF THE INVENTION

The present invention provides a means for causing a fan or blower to continue to run after a thermostat located within a house or building has caused a heating or air conditioning system to deactivate so that all of the usable heated or cooled air is removed from the system and the accompanying duct work. The device of the present invention is energized by the house or building thermostat so that it is operational in response to the operation of the heat or air conditioning system, but will not be actuated by outside air temperature changes or other changes in the air temperature in the duct work.

Briefly, the heat or air conditioning system is actuated by a thermostat located inside a building, as is the fan or blower. Further, this thermostat also actuates a circuit which is also controlled by a sensor located within the duct work. After the temperature within the building reaches the desired level, and the building thermostat opens, the heating or air conditioning system is deactivated. The circuit remains energized, and if the sensor which is located in the duct work is closed in response to the presence of heated or cooled air in the duct, this circuit causes the fan to continue to run until the sensor opens in reponse to the duct temperature rising to the predetermined level (in the case of air conditioning) or falling to the predetermined level (in the case of heat). When the sensor opens, the circuit is de-energized, so that if the sensor subsequently closes in response to the ambient air temperature of the duct work changing, the fan will not be activated.

DETAILED DESCRIPTION OF THE DRAWINGS

DETAILED DESCRIPTION OF THE PREFERRED EMBODIMENT

Figure 1:
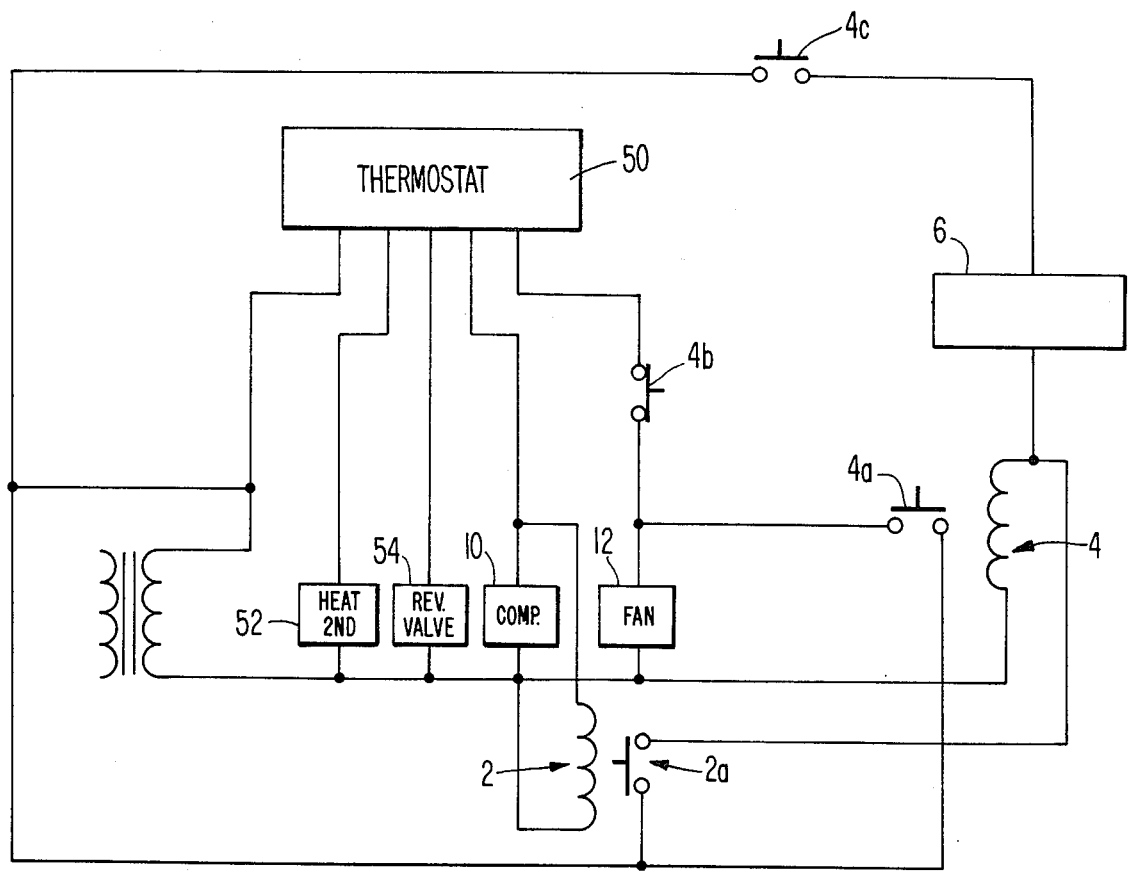
FIG. 1 is a schematic diagram showing the invention integrated into a common heating and air conditioning system for a building wherein a heat pump is used to produce heated and cooled air.

FIG. 1 shows a schematic of a control system for a typical heat pump as is commonly in use. The existing thermostat 50 controls various devices, including the secondary heat 52, the reversing valve 54, the compressor 10 and the fan 12. The secondary heat 52 and reversing valve 54 are shown in the schematic for completeness and demonstrative purposes, but are not necessary to the operation of the invention.

The thermostat 50 which is contemplated in the preferred embodiment is a typical thermostat which is placed on the wall of a house or other building, and may be used with the invention without modification. A desired temperature is set for the thermostat 50. If the thermostat is to control heating, a temperature is set which causes the thermostat to close when the inside air temperature reaches a desired minimum level. Alternatively, the thermostat 50 may be set so as to control the air conditioning, by causing the thermostat 50 to close when the inside air temperature has reached a maximum level.

Upon the ambient inside air temperature reaching the appropriate temperature, the thermostat 50 closes, activating the heating or air conditioning system, or in the case of a heat pump, the compressor 10, causing the compressor 10 to become operational. At the same time fan 12 begins to operate. As can be seen in FIG. 1, as the compressor 10 is actuated, relay 2 is energized. Relay 2 may be a single pole, single throw (normally open), relay and may have a twenty-four volt AC coil.

Energizing relay 2 closes 2a. 2a in turn energizes relay 4. Relay 4 may be a double pole double throw relay, and may have a twenty-four volt AC coil. The energizing of relay 4 opens 4b (normally closed) and closes 4a (normally open) and closes 4c (normally open). In this manner, the control circuit for a sensor 6 is energized.

This sensor 6 is placed within the duct work of the building. The sensor 6 senses the temperature of the air within the duct work which has been received from the heating or air conditioning unit. In the case of the heating system being operational, if the air within the duct work is above a desired temperature as set within the sensor, then the sensor will close, and in the case of air conditioning, if the temperature of the air within the duct work is below a temperature set within the sensor, then the sensor will close. If the sensor 6 is closed, and the control cicuit has been energized as described above, then the fan 12 will continue to run even though the compressor 10 ceases to operate due to the opening of the thermostat 50. This continued operation of the fan 12 forces the remaining heated or cooled air from the system and duct work, so that all heated or cooled air is forced into the building and is not wasted.

At such time as the temperature in the duct work falls below the set temperature in the case of heated air, or rises above the set temperature in the case of cooled air, the sensor 6 in the duct will open. When this occurs, the fan 12 is deactivated and ceases to operate and the relays in the energizing circuit return to their normal positions. Accordingly, if the temperature in the duct work rises or falls to a level which would close the sensor 6 within the duct work, the fan 12 is not activated, since the relays and the circuit have been de-energized. It is required by this system that the circuit, through the relays, be energized and that the sensor within the duct be closed. If the system is energized, but the sensor is not closed, then the fan is not operational. At the same time, if the sensor is closed but the circuit is not energized, then the fan will not become operational.

The fan control sensor above described is as applied to a typical heat pump system. This heat pump system is characterized by a compressor which produces heated or cooled air as desired, at a central location. A fan is then used to force the heated or cooled air from the central location through a series of ducts into the desired area within the building.

The present invention then produces increased efficiency for the heating and air conditioning system since it causes the fan to continue to run even after the compressor ceases to run. The system removes all of the heated or cooled air from the duct work, eliminating wasted heated or cooled air.

The fan is terminated at the precise time that the temperature in the duct work reaches the desired level by use of the sensor located within the duct work. However, closing of the sensor by changes in the air temperature in the duct work due to changes in temperature in the outside air will not cause the fan to become operational, since the sensor and compressor must first energize the control circuit and then the sensor located in the duct work must close. Closing of the sensor alone will not activate the fan.

Figure 2:
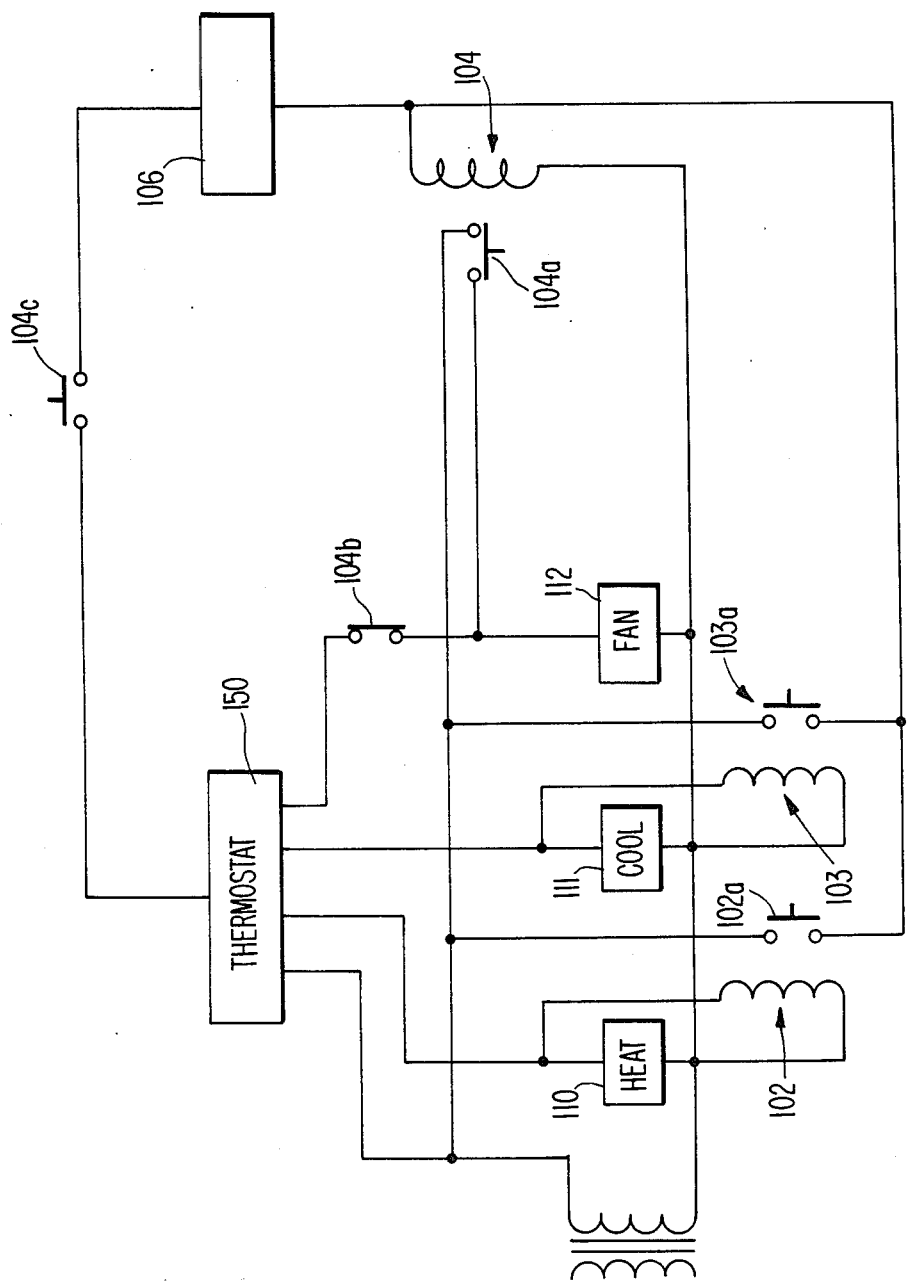
FIG. 2 is a schematic diagram showing the invention integrated into a common heating and air conditioning system for a building wherein a heating unit is used to produce heated air and a separate air conditioning unit is used to produce cool air.

FIG. 2 shows a second application with the fan sensor control integrated into a central heating and air conditioning unit using separate heating and cooling units with a single, central fan or blower. This heating system may be oil, gas, electric or other known heating means which is capable of thermostatic control. The existing building thermostat 150, which is placed on an inside wall of the building, closes when the air temperature falls to a certain minimum level in the case of heat, or rises to a maximum level for air conditioning, as set and determined by the user. If the air temperature falls to the minimum level, the heating unit is activated, energizing relay 102, or if the air temperature rises to a maximum level, the thermostat closes activating the air conditioning unit, and energizing relay 103. Relays 102 and 103 may be single pole single throw (normally open) relays, and may have twenty-four volt AC coils. The energizing of relay 102 closes 102a (normally open) and the energizing of relay 103 closes 103a (normally open).

As relay 102 or relay 103 is energized, relay 104 is energized, opening 104b (normally closed) and closing 103a (normally open) and also closing 104c (normally open).

The circuit is now energized, and as before, when the air temperature in the duct rises to a predetermined level or falls to a predetermined level, then sensor 106 closes. With the circuit energized and sensor 106 closed, the fan 112 will continue to operate even though the existing house or building thermostat 150 has opened so as to deactivate the heating or cooling unit, causing it to cease to operate. The fan 112 continues to run until the air in the duct work changes to a temperature which causes sensor 106 to open, deactivating the fan 112 and turning it off. At the same time, as sensor 106 opens, the relays within the circuit are returned to their normal position, and the circuit is "de-energized". Should the temperature in the duct work now reach a level due to ambient air temperature which causes sensor 106 to close, it will not cause fan 112 to become operational, since the circuit has not been energized as described.

Sensor 6 or 106 is of a type commonly commercially available and currently used in the heating and air conditioning industry. Typical values for sensor 6 or 106, if a preset sensor is used, would be 80 degrees F for heat and 72 degrees F for air conditioning. However, sensor 6 or 106 could be a variable sensor, adjustable as is the house or building wall thermostat.

In actual practice, using an oil furnace, wherein the fan continues to run until the plenum temperature reaches 110 degreees F (as is typical of heating systems currently in use), the fan in a particular house system ran for six (6) minutes after the furnace shut off. The present invention was then installed into the system, with an 80 degree F sensor, and the fan ran for 15 (15) minutes after the furnace ceased to operate. This invention therefore "harvested" additional heated air for an extra nine (9) minutes, which represents heated air which would have otherwise been lost.

With air conditioning, the invention installed in a tupical residential system caused the fan to run for an extra seven (7) to eleven (11) minutes, again "harvesting" cooled air which would otherwise be wasted.

What is claimed is:

1. A fan sensor control for a heating and air conditioning system, comprising:
   a. a thermostat which closes in response to temperature in a building reaching a selectively determinable upper or lower limit;
   b. a heating system which is actuated by said thermostat reaching said lower limit;
   c. an air conditioning system which is actuated by said thermostat reaching said upper limit;
   d. a fan which is actuated in response to said thermostat closing;
   e. a sensor which is located in a duct receiving air from said heating system and said air conditioning system which closes upon a temperature within said duct reaching a set upper limit or a set lower limit;
   f. a circuit means which energizes a relay upon actuation of said fan, causing contact points between an electrical source and said fan to close, while causing contact points in a circuit between said thermostat and said fan to open, and causing contact points in a circuit between said thermostat and said sensor to close so as to allow said sensor to control operation of said fan.

2. A fan sensor control for a heating and air conditioning system, comprising:
   a. a thermostat which closes in response to temperature in a building reaching a selectively determinable upper or lower limit;
   b. heating system which is actuated by said thermostat reaching said lower limit;
   c. an air conditioning system which is actuated by said thermostat reaching said upper limit;
   d. a fan which is actuated in response to said thermostat closing;
   e. a sensor which is located in a duct receiving air from said heating system and said air conditioning system which closes upon a temperature within said duct reaching a set upper limit or a set lower limit;
   f. a circuit means which energizes a relay upon actuation of said fan, causing contact points between an electrical source and said fan to close, while causing contact points in a circuit between said thermostat and said fan to open, and causing contact points in a circuit between said thermostat and said sensor to close so as to allow said sensor to control the operation of said fan, and wherein said relay is deenergized in response to said sensor deactuating said fan so as to open said contact points between said electrical source and said fan, and close said contacts between said thermostat and said fan, and open said contact points between said thermostat and said sensor to return control of said fan to said thermostat.

* * * * *